(12) United States Patent
Tomaru et al.

(10) Patent No.: US 11,049,268 B2
(45) Date of Patent: Jun. 29, 2021

(54) SUPERIMPOSING POSITION CORRECTION DEVICE AND SUPERIMPOSING POSITION CORRECTION METHOD

(71) Applicant: Mitsubishi Electric Corporation, Tokyo (JP)

(72) Inventors: Yoshihiro Tomaru, Tokyo (JP); Takeshi Osaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 13 days.

(21) Appl. No.: 16/470,676

(22) PCT Filed: Mar. 2, 2017

(86) PCT No.: PCT/JP2017/008240
§ 371 (c)(1),
(2) Date: Jun. 18, 2019

(87) PCT Pub. No.: WO2018/158903
PCT Pub. Date: Sep. 7, 2018

(65) Prior Publication Data
US 2019/0385318 A1 Dec. 19, 2019

(51) Int. Cl.
*G06T 7/33* (2017.01)
*G06T 7/73* (2017.01)
*G06T 7/11* (2017.01)
*G06T 3/20* (2006.01)
*G06T 3/60* (2006.01)

(52) U.S. Cl.
CPC ............... *G06T 7/337* (2017.01); *G06T 3/20* (2013.01); *G06T 3/60* (2013.01); *G06T 7/11* (2017.01); *G06T 7/74* (2017.01)

(58) Field of Classification Search
None
See application file for complete search history.

(56) References Cited

U.S. PATENT DOCUMENTS

| | | | | |
|---|---|---|---|---|
| 7,209,583 B2* | 4/2007 | Enokido | ............ | B23K 20/004 382/145 |
| 2003/0016860 A1* | 1/2003 | Sugawara | ................ | G06T 7/74 382/151 |
| 2009/0092336 A1* | 4/2009 | Tsurumi | ............... | G06K 9/6282 382/294 |

FOREIGN PATENT DOCUMENTS

JP 2010-99574 A 5/2010
WO WO 2015/170639 A1 11/2015

OTHER PUBLICATIONS

Hu, "Visual Pattern Recognition by Moment Invariants," IRE Transactions on Information Theory, 1962, pp. 179-187.
Zhang, "A Flexible New Technique for Camera Calibration," Microsoft Research Technical Report MSR-TR-98-71, 1998, pp. 1-21.

* cited by examiner

*Primary Examiner* — Leon Viet Q Nguyen
(74) *Attorney, Agent, or Firm* — Birch, Stewart, Kolasch & Birch, LLP

(57) ABSTRACT

A superimposing position correction device includes an image acquisition unit, a difference image generation unit, a processing plan image generation unit, a subregion generation unit, a similar shape search unit, a representative point extraction unit, a projection matrix calculation unit and a superimposition display unit.

10 Claims, 9 Drawing Sheets

SUPERIMPOSING POSITION CORRECTION DEVICE AND SUPERIMPOSING POSITION CORRECTION METHOD

TECHNICAL FIELD

The present invention relates to a superimposing position correction device to be used for a processing system.

BACKGROUND ART

Correction for position shift of a processing position is generally employed in laser processing systems using a laser processing machine. For example, there is proposed a method of correcting a start position of processing in laser processing machine by performing processing on a tabular workpiece for correction and comparing the processed position with the previously specified processing position (see Patent Reference 1, for example).

Further, in recent years, there is proposed a method of superimposing an image or information indicating a processing position (processing plan locus) or the like on a workpiece that is a processing object displayed on a display device such as a monitor by means of AR (Augmented Reality). In laser processing systems employing AR, it is necessary to associate positions with each other between a machine coordinate system as a plane on which the workpiece is placed and an image coordinate system in a camera image.

PRIOR ART REFERENCE

Patent Reference

Patent Reference 1: Japanese Patent Application Publication No. 2010-99674

SUMMARY OF THE INVENTION

Problem to be Solved by the Invention

However, there is a case where the whole of the laser processing machine vibrates during the processing and a change occurs in the position of the workpiece or the position and posture of the camera. In this case, a method of correcting the positions of the workpiece and the camera by using a checker pattern or markers is used, for example. However, the conventional technology has a problem of lacking simplicity of maintenance such as position adjustment for displaying.

An object of the present invention, which has been made to resolve the above-described problem, is to correct the processing plan locus to be superimposed on the workpiece with a simple method.

Means for Solving the Problem

A superimposing position correction device according to the present invention includes: a processor to execute a program; and
a memory to store the program which, when executed by the processor, performs processes of,
acquiring a first image frame including an image of a workpiece that is processing object and a second image frame including an image of the workpiece after being processed;
acquiring the first image frame and the second image frame and generating a difference image, the difference image being an image including a process region that is difference between the first image frame and the second image frame;
generating a processing plan image based on a predetermined processing plan locus to be superimposed on the workpiece;
generating at least one subregion including a processing plan region of the workpiece, the processing plan region being determined based on the predetermined processing plan locus;
searching the difference image for a region similar to the subregion and to acquire the region similar to the subregion as an identified region;
extracting barycenter coordinates of the processing plan region included in the subregion in a machine coordinate system and barycenter coordinates of the processed region included in the identified region in an image coordinate system;
calculating a projection matrix for performing projection transformation between the machine coordinate system and the image coordinate systme by using the barycenter coordinates in the machine coordinate system and the barycenter coordinates in the image coordinate system; and
transforming the predetermined processing plan locus in the machine coordinate system into a new processing plan locus in the image coordinate system by using the projection matrix.

Effect of the Invention

According to the present invention, the processing plan locus to be superimposed on the workpiece can be corrected with a simple method.

MODE FOR CARRYING OUT THE INVENTION

Embodiment

Figure 1:
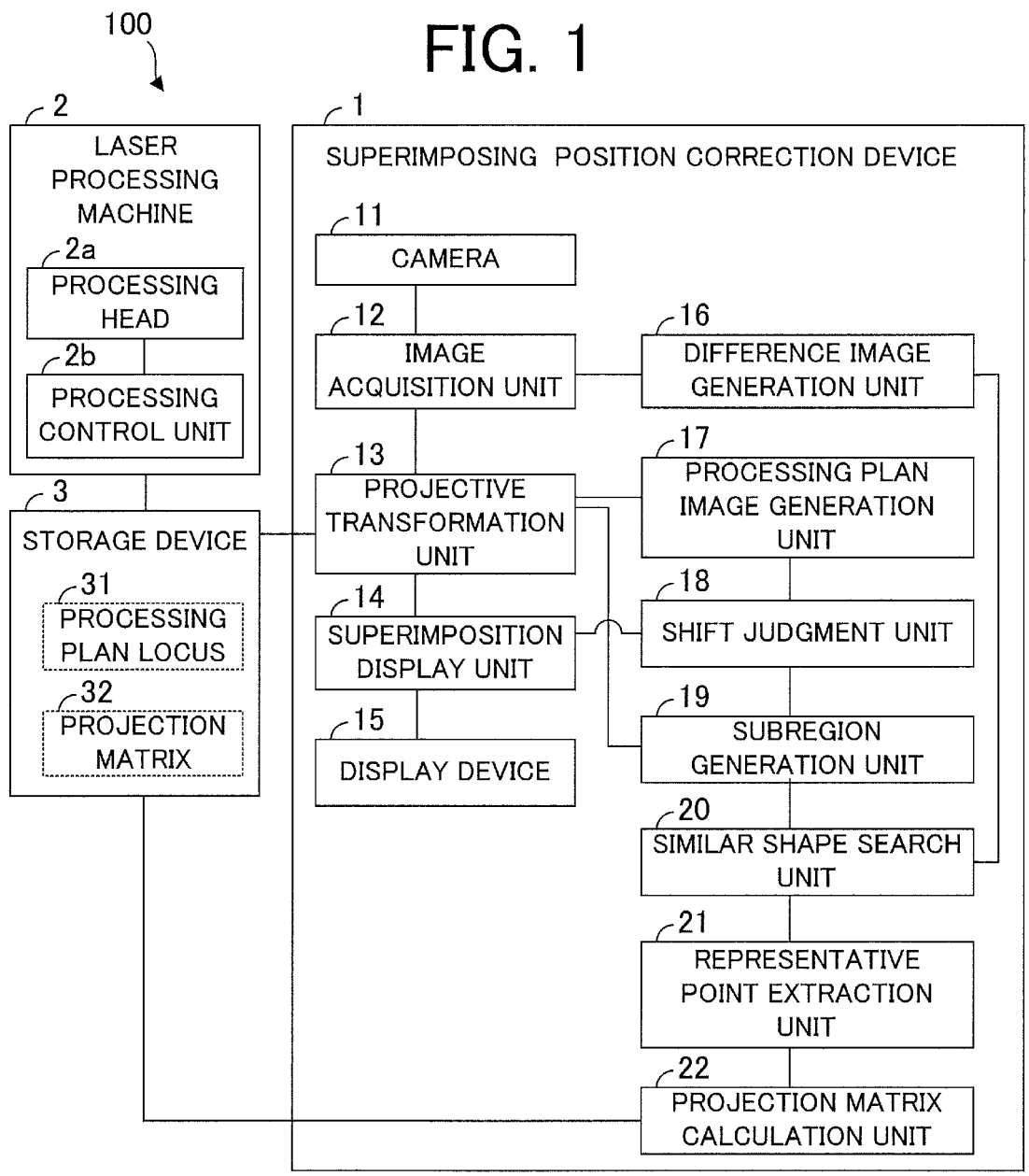
FIG. 1 is a block diagram schematically showing a configuration of a laser processing system including a superimposing position correction device according to an embodiment of the present invention.

FIG. 1 is a block diagram schematically showing a configuration of a laser processing system 100 including a superimposing position correction device 1 according to an embodiment of the present invention.

The laser processing system 100 includes the superimposing position correction device 1, a laser processing machine 2 and a storage device 3. While the storage device 3 in this embodiment is a storage medium provided outside the superimposing position correction device 1 and the laser processing machine 2, the storage device 3 may be provided inside the superimposing position correction device 1 or the laser processing machine 2.

The superimposing position correction device 1 includes a camera 11, an image acquisition unit 12, a projective transformation unit 13, a superimposition display unit 14, a display device 15, a difference image generation unit 16, a processing plan image generation unit 17, a shift judgment unit 18, a subregion generation unit 19, a similar shape search unit 20, a representative point extraction unit 21 and a projection matrix calculation unit 22.

The camera 11 captures a workpiece w1 that is a material to be processed (i.e., processing object) and a region around the workpiece w1.

The image acquisition unit 12 acquires images captured by the camera 11 as respective still images (e.g., image frame f1 which will be explained below).

Figure 2:
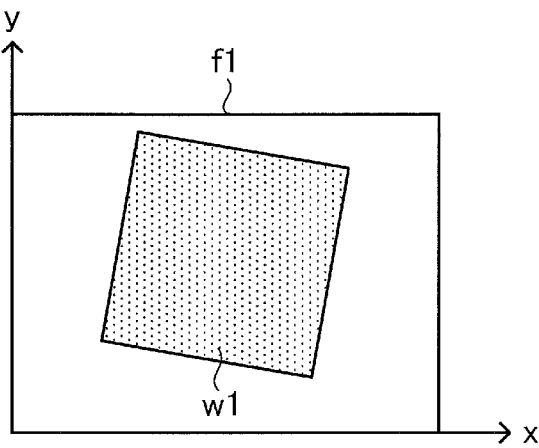
FIG. 2 is a diagram showing an example of an image frame acquired by an image acquisition unit.

FIG. 2 is a diagram showing an example of the image frame f1 (first image frame) acquired by the image acquisition unit 12. The image frame f1 shown in FIG. 2 is an image including an image of the workpiece w1 that is the processing object. The image frame f1 is a camera image acquired by the camera 11.

Figure 3:
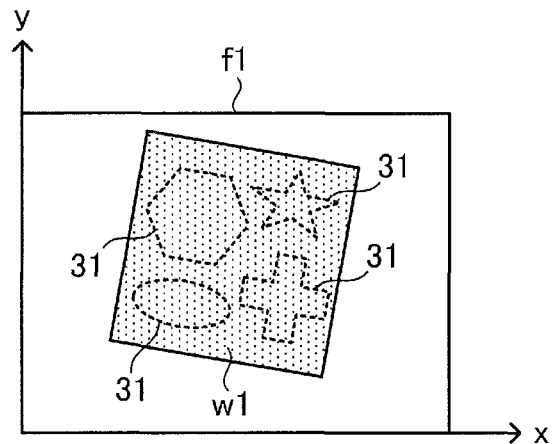
FIG. 3 is a diagram showing processing plan loci superimposed on a workpiece in the image frame.

FIG. 3 is a diagram showing processing plan loci 31 superimposed on the workpiece w1 in the image frame f1. The processing plan loci 31 are data indicating processing positions that are processing plans in a machine coordinate system. In the image frame f1, each of the processing plan loci 31 is indicated by graphics. The processing plan locus 31 indicated in the image frame f1 is referred to also as a processing plan image.

The projective transformation unit 13 transforms the processing plan locus 31 into data corresponding to an image coordinate system by using a projection matrix 32. The image coordinate system is an orthogonal coordinate system (i.e., xy plane) in the image frame f1.

The superimposition display unit 14 draws the processing plan locus 31 as graphics in the image frame f1 acquired by the image acquisition unit 12.

The image frame f1 is displayed on the display device 15. In this embodiment, the display device 15 is a display. For example, on the display device 15, the processing plan locus 31 transformed into data corresponding to the image coordinate system is superimposed on the workpiece w1 in the image frame f1.

Figure 4:
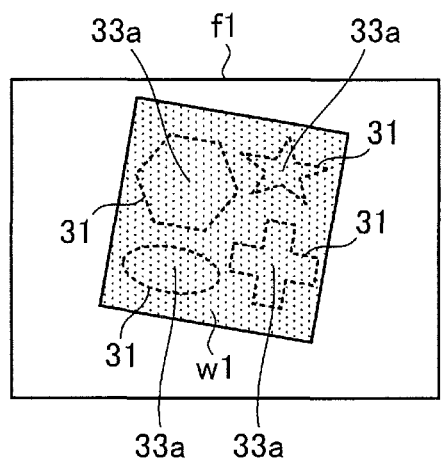
FIG. 4 is a diagram showing the image frame as a camera image before processing is performed.

FIG. 4 is a diagram showing the image frame f1 as a camera image before the processing is performed. Each region surrounded by the processing plan locus 31 is a processing plan region 33a.

Figure 5:
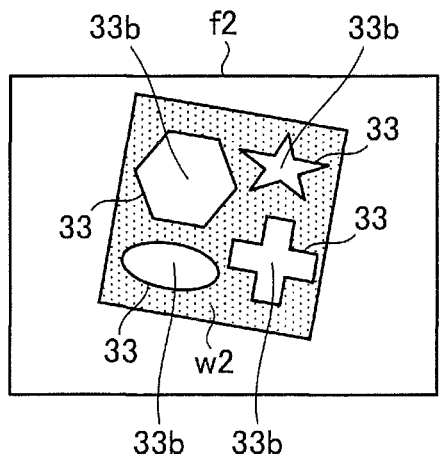
FIG. 5 is a diagram showing an image frame as a camera image after the processing is performed.

FIG. 5 is a diagram showing an image frame f2 (second image frame) as a camera image after the processing is performed. The image frame f2 shown in FIG. 5 is an image including an image of a workpiece w2 processed by the laser processing machine 2 (i.e., workpiece w2 after the processing) and processed regions 33b surrounded by processing tracks 33.

Figure 6:
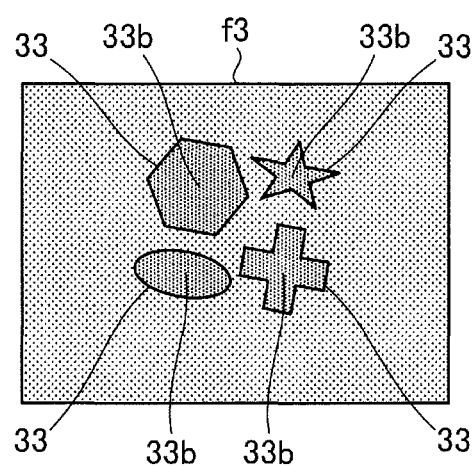
FIG. 6 is a diagram showing a difference image generated by a difference image generation unit.

FIG. 6 is a diagram showing a difference image f3 generated by the difference image generation unit 16.

The difference image generation unit 16 generates the difference image f3 based on difference between the image frame f1 (FIG. 2) as the camera image before the processing is performed and the image frame f2 that is the camera image after the processing is performed.

The processing plan image generation unit 17 generates the processing plan image based on the predetermined processing plan locus 31 to be superimposed on the workpiece w1. The processing plan image is an image including the processing plan locus 31.

Figure 7:
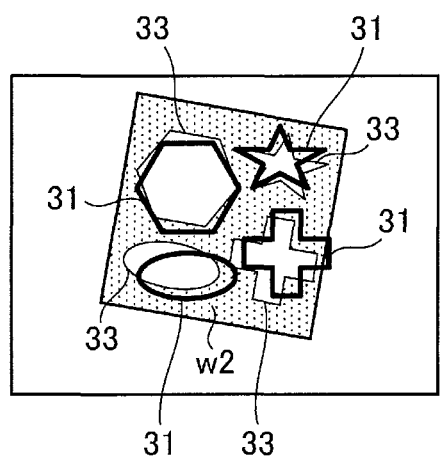
FIG. 7 is a diagram showing an image frame as a comparative example.

FIG. 7 is a diagram showing an image frame as a comparative example.

As shown in FIG. 7, there is a case where the processing plan locus 31 and the processing track 33 are shifted from each other when the position of the workpiece w2 shifted during the processing. The shift judgment unit 18 judges whether or not the processing plan locus 31 and the processing track 33 are shifted from each other by comparing the processing plan image and the difference image (difference image f4 which will be explained later).

The subregion generation unit 19 generates at least one subregion 34. The subregion 34 is a region including a processing plan region 33a determined based on the processing plan locus 31 (specifically, a region of the workpiece w1 surrounded by the processing plan locus 31).

The similar shape search unit 20 searches the difference image (the difference image f4 which will be explained later) for a region similar to the subregion 34 generated by the subregion generation unit 19.

The representative point extraction unit 21 extracts a representative point as barycenter coordinates of the processing plan region 33a (processing shape in this embodiment) included in the subregion 34 generated by the subregion generation unit 19 in the machine coordinate system and a representative point as barycenter coordinates of the processed region 33b included in an identified region 35 in the image coordinate system.

The projection matrix calculation unit 22 calculates a projection matrix (projection matrix H which will be explained later) for making the superimposing position correction in the laser processing system 100.

The laser processing machine 2 includes a processing head 2a that emits a laser beam and a processing control unit 2b that controls the processing head 2a. The processing head 2a is an emission port of a laser. The processing control unit 2b is capable of moving the processing head 2a according to the processing plan locus 31.

The storage device 3 stores the processing plan locus 31 and the projection matrix 32.

The processing plan locus 31 is predetermined data and indicates processing positions that is a processing plan in the machine coordinate system.

The projection matrix 32 is data (matrix) for performing projective transformation between the machine coordinate system and the image coordinate system and indicates correlation between the machine coordinate system in the laser processing machine 2 and the image coordinate system in the camera 11 (i.e., camera image) previously determined by using an index such as a checkerboard.

Next, a superimposing position correction method in the laser processing system 100 will be described.

Figure 8:
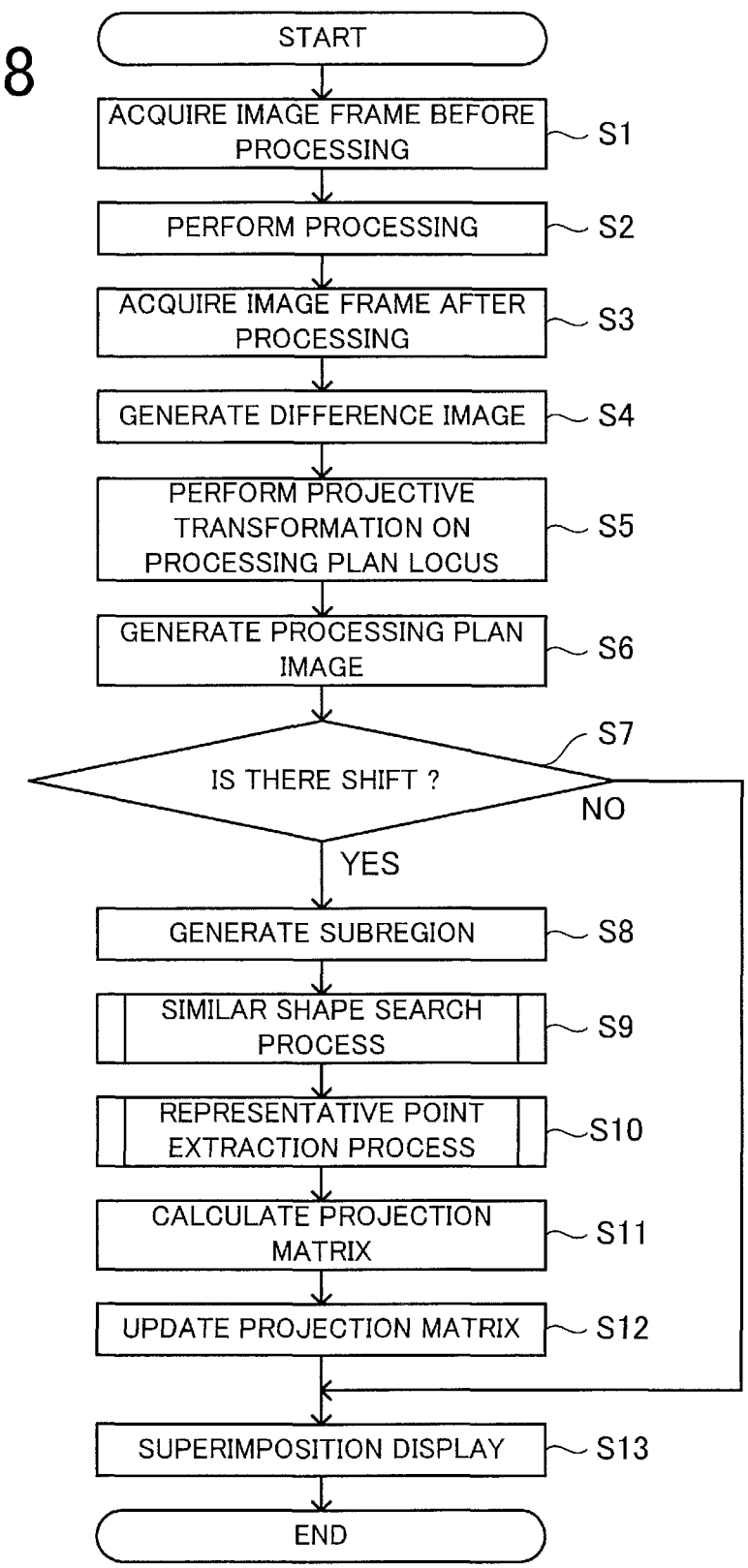
FIG. 8 is a flowchart showing an example of a superimposing position correction method in the laser processing system.

FIG. 8 is a flowchart showing an example of the superimposing position correction method in the laser processing system 100.

In step S1, the camera 11 captures the workpiece w1 before the processing is performed and the image acquisition unit 12 acquires the image frame f1.

In step S2, the laser processing machine 2 processes the workpiece w1 according to the processing plan locus 31. Specifically, the processing control unit 2b controls the processing head 2a according to the processing plan locus 31 and thereby processes the workpiece w1. For example, when the workpiece w1 is processed into four processing shapes (referred to also as processing geometries) of an ellipse, a pentagram, a cross, and a hexagon, the workpiece w2 is obtained as shown in FIG. 5.

In step S3, the camera 11 captures the workpiece w2 and the image acquisition unit 12 acquires the image frame f2 from the camera image.

In step S4, the difference image generation unit 16 acquires the image frame f1 and the image frame f2 from the image acquisition unit 12 and generates the difference image f3 including the processed regions 33b that are the difference between the image frame f1 and the image frame f2. In the difference image f3, only the processing tracks 33 and the processed regions 33b (four processing shapes in the example shown in FIG. 6) are shown.

Figure 9:
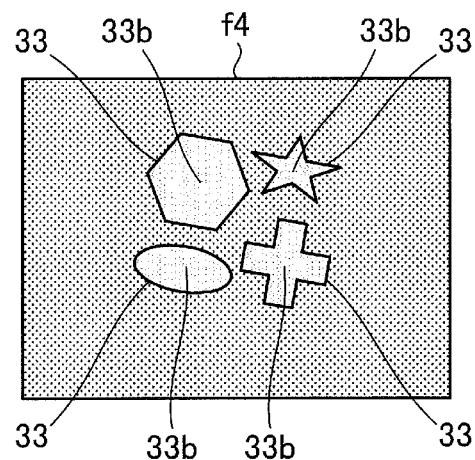
FIG. 9 is a diagram showing a difference image normalized by the difference image generation unit.

FIG. 9 is a diagram showing a difference image f4 normalized by the difference image generation unit 16.

In the difference image f3 shown in FIG. 6, pixel values in a region other than the processed regions 33b are 0 and pixel values in the processed regions 33b are indefinite values other than 0, and thus normalization is performed so that the pixel values in the processed regions 33b become 1. As a result, a binary image in which the pixel values in the region other than the processed regions 33b are 0 and the pixel values in the processed regions 33b are 1 is obtained as shown in FIG. 9.

In step S5, the projective transformation unit 13 performs the projective transformation on the processing plan locus 31. Namely, the projective transformation unit 13 transforms the processing plan locus 31 based on the machine coordinate system into data based on the image coordinate system by using the following expression 1:

$$\begin{pmatrix} x_c \\ y_c \\ 1 \end{pmatrix} = \lambda H \begin{pmatrix} x_m \\ y_m \\ 1 \end{pmatrix} \quad \text{expression 1}$$

In the expression 1, $x_c$ and $y_c$ represent a position on the xy plane in the image coordinate system in the camera image. In the expression 1, $x_m$ and $y_m$ represent a two-dimensional position in the machine coordinate system as the coordinate system for controlling the processing head 2a. In the expression, H represents the projection matrix 32 and A represents any real number. In this embodiment, the projection matrix 32 is a 3×3 matrix and is previously calculated.

Figure 10:
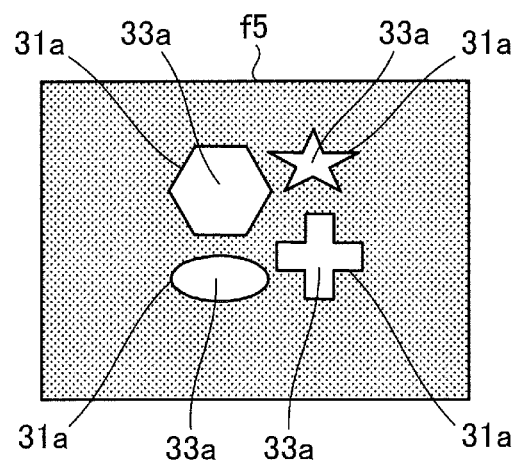
FIG. 10 is a diagram showing a processing plan image in an image coordinate system after projective transformation is performed.

FIG. 10 is a diagram showing the processing plan image in the image coordinate system after the projective transformation is performed.

In step S6, the processing plan image generation unit 17 generates the processing plan image. Specifically, the processing plan image is generated based on the processing plan locus 31a after undergoing the projective transformation in the step S5 so that the pixel values in the processing plan regions 33a are 1 and the pixel values in the region other than the processing plan regions 33a are 0. As a result, the processing plan image after performing the projective transformation is obtained in an image frame f5 shown in FIG. 10.

In step S7, the shift judgment unit 18 compares the difference image f4 and the processing plan image in the image frame f5 and thereby judges whether or not the processing plan image (specifically, the processing plan locus 31a in the image frame f5) is shifted from the difference image f4 (specifically, the processing track 33 in the difference image f4). In this embodiment, the shift judgment unit 18 compares the pixel value of each pixel in the processing plan image in the image frame f5 and the pixel value of each pixel in the difference image f4 in regard to coordinates equal to each other and judges whether the processing plan image (f5) is shifted from the difference image (f4) or not by counting the total number of pixels having different pixel values (pixel total number).

The shift judgment unit 18 judges that "there is no shift" when the pixel total number is smaller than a predetermined shift judgment threshold value, or judges that "there is a shift" when the pixel total number is larger than or equal to the shift judgment threshold value. The shift judgment threshold value may be set at 1% of the total number of pixels in the image frame f5, for example.

When the shift judgment unit 18 judges that the processing plan locus 31a is not shifted from the processing track 33 (NO in the step S7), the process advances to step S13.

When the shift judgment unit 18 judges that the processing plan locus 31a is shifted from the processing track 33 (YES in the step S7), the process advances to step S8.

Figure 11:
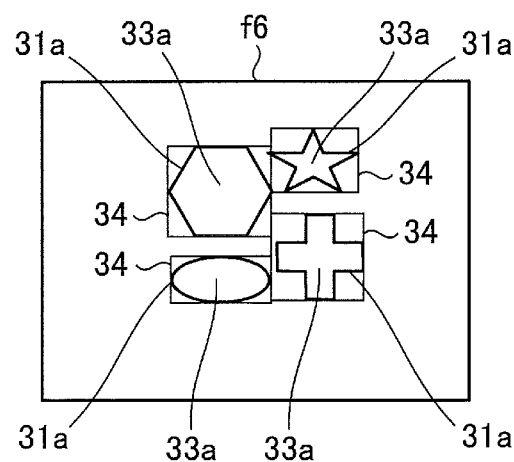
FIG. 11 is a diagram showing subregions generated in an image frame.

FIG. 11 is a diagram showing subregions 34 generated in an image frame f6.

In the step S8, the subregion generation unit 19 generates at least one subregion 34 including at least one processing plan region 33a (at least one processing shape in this embodiment). For example, the subregion generation unit 19 determines a circumscribed rectangle of each processing shape in the image frame f5. By this method, each subregion 34 including one processing shape can be generated in the image frame f6 as shown in FIG. 11. Namely, four subregions 34 are generated in this embodiment.

In the step S8, a plurality of subregions 34 externally contacting each other may be formed. In this case, two or more processing shapes are included in the plurality of subregions 34.

In step S9, a similar shape search process is executed. Specifically, the similar shape search unit 20 searches the difference image f4 for a region similar to a subregion 34 in the processing plan image and acquires the region similar to a subregion 34 in the processing plan image as an identified region 35.

Figure 12:
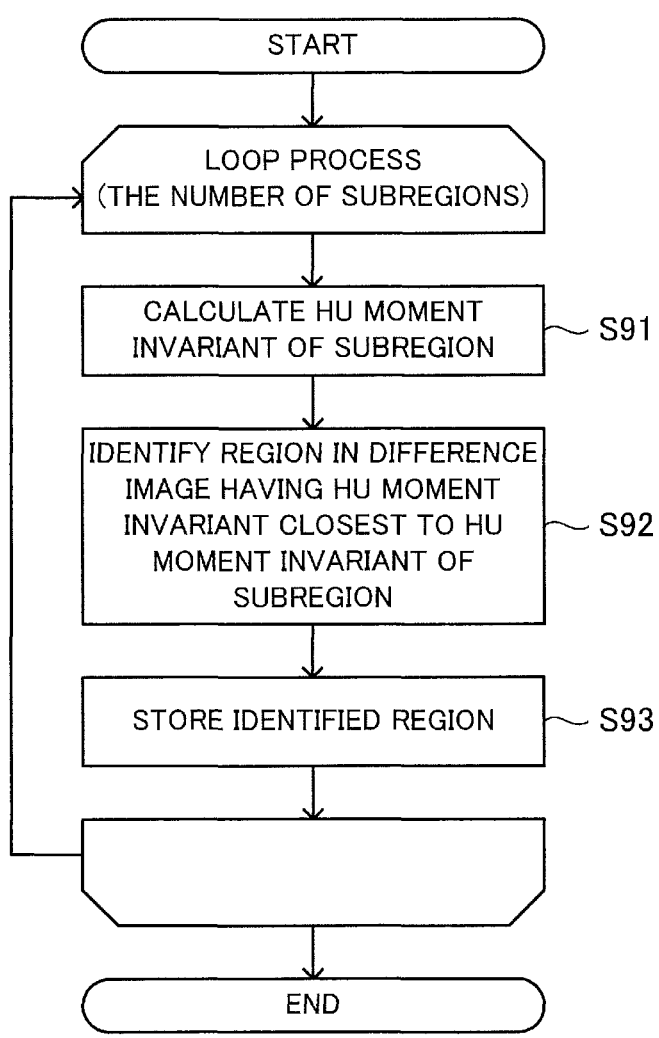
FIG. 12 is a flowchart showing an example of the flow of a similar shape search process.

FIG. 12 is a flowchart showing an example of the flow of the similar shape search process.

In step S91, the similar shape search unit 20 calculates an Hu moment invariant of the image in the subregion 34 of the processing plan image. For example, the Hu moment invariant is calculated by using a method described in the following document as a non-patent reference:

Ming-Kuei HU. "Visual Pattern Recognition by Moment Invariants" IRE TRANSACTIONS ON INFORMATION THEORY, vol. IT-8, pp 179-187, 1962

The Hu moment invariant can be calculated for any region in an image and has a characteristic of being invariable between an image in which a certain shape is shown and an image in which the shape is changed in scale, rotated, or translated.

In step S92, the similar shape search unit 20 identifies and acquires a region in the difference image f4 having the same size as the subregion 34 and having an Hu moment invariant closest to the Hu moment invariant obtained in the step S91. Specifically, a region having the same size as the subregion 34 is moved in the difference image f4 pixel by pixel, the Hu moment invariant is obtained upon each movement of the region, and a region minimizing the norm of the difference between the Hu moment invariant of the subregion 34 in the processing plan image and the Hu moment invariant obtained in the difference image f4 is identified.

In step S93, the region in the difference image f4 obtained in the step S92 is acquired and stored as the identified region 35.

Figure 13:
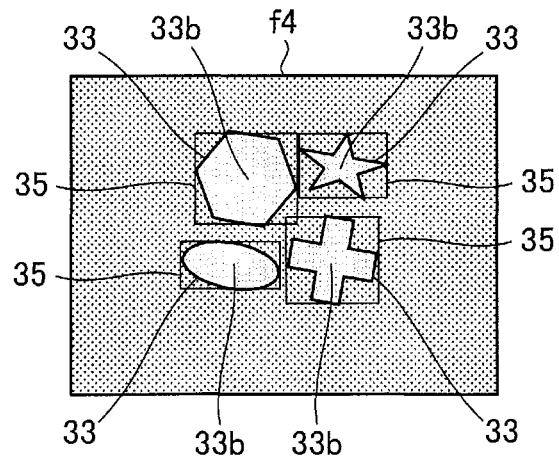
FIG. 13 is a diagram showing identified regions in the difference image.

FIG. 13 is a diagram showing the identified regions 35 in the difference image f4.

The processing from the step S91 to the step S93 is performed for each of the subregions 34 in the processing plan image. Accordingly, in this embodiment, four identified regions 35 are acquired as shown in FIG. 13.

In step S10, a representative point extraction process is executed. Specifically, the representative point extraction unit 21 extracts the representative point as the barycenter coordinates of the processing plan region 33a (processing shape in this embodiment) included in the subregion 34 in the machine coordinate system and the representative point as the barycenter coordinates of the processed region 33b included in the identified region 35 in the image coordinate system.

Figure 14:
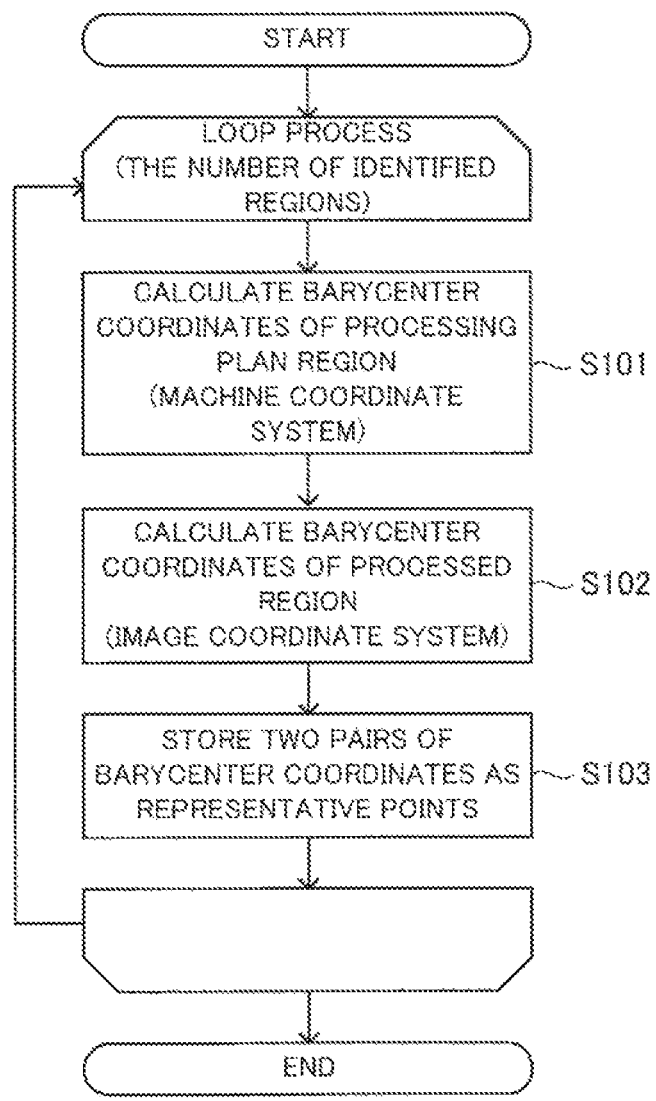
FIG. 14 is a flowchart showing an example of a representative point extraction process.

FIG. 14 is a flowchart showing an example of the representative point extraction process.

In step S101, the representative point extraction unit 21 calculates the barycenter coordinates of the processing plan region 33a included in a subregion 34 corresponding to one identified region 35 in the difference image f4. Specifically, the representative point extraction unit 21 is capable of extracting the barycenter coordinates by calculating the average of all machine coordinates (i.e., coordinates in the machine coordinate system) in the processing plan region 33a included in the subregion 34 corresponding to one identified region 35 (i.e., a subregion 34 similar to the identified region 35) in the difference image f4.

In step S102, the representative point extraction unit 21 calculates the barycenter coordinates of the processed region 33b included in the identified region 35 (i.e., the identified region 35 used in the step S101) in the difference image f4. Specifically, the representative point extraction unit 21 is capable of extracting the barycenter coordinates by calculating the average of all image coordinates (i.e., coordinates in the image coordinate system) in the processed region 33b where the pixel value equals 1 in the identified region 35.

In step S103, the barycenter coordinates obtained in the steps S101 and S102, namely, two pairs of barycenter coordinates, are stored as the representative points.

Figure 15:
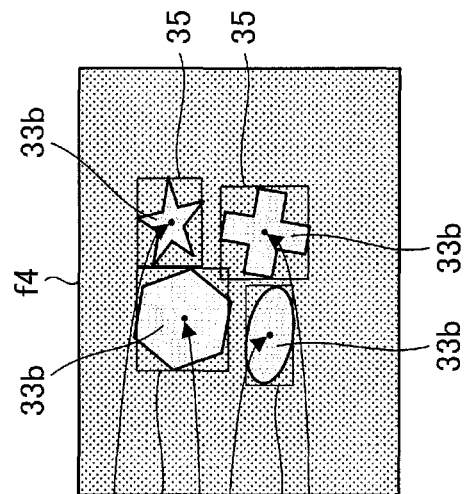
FIG. 15 is a diagram schematically showing sets of representative points.

FIG. 15 is a diagram schematically showing sets of representative points.

The processing from the step S101 to the step S103 is performed for each identified region 35 and each subregion 34 corresponding to the identified region 35. Accordingly, as many representative point sets g1, g2, g3 and g4 as the identified regions 35 are acquired. In this embodiment, four representative point sets g1, g2, g3 and g4 are acquired as shown in FIG. 15.

In step S11, the projection matrix calculation unit 22 calculates the projection matrix H for performing the projective transformation between the machine coordinate system and the image coordinate system (in other words, the projection matrix H for making the superimposing position correction) by using the barycenter coordinates in the machine coordinate system and the barycenter coordinates in the image coordinate system. Specifically, the projection matrix H can be obtained by substituting the representative point sets g1, g2, g3 and g4 acquired in the step S10 into the aforementioned expression 1. Since the degree of freedom of the projection matrix 32 is 8, at least four representative point sets are necessary for obtaining the projection matrix H.

In step S12, the projection matrix H obtained in the step S11 is stored in the storage device 3. Specifically, the projection matrix 32 is updated to the new projection matrix (i.e., the projection matrix H obtained in the step S11). Accordingly, a corrected projection matrix for making the superimposing position correction can be obtained.

Figure 16:
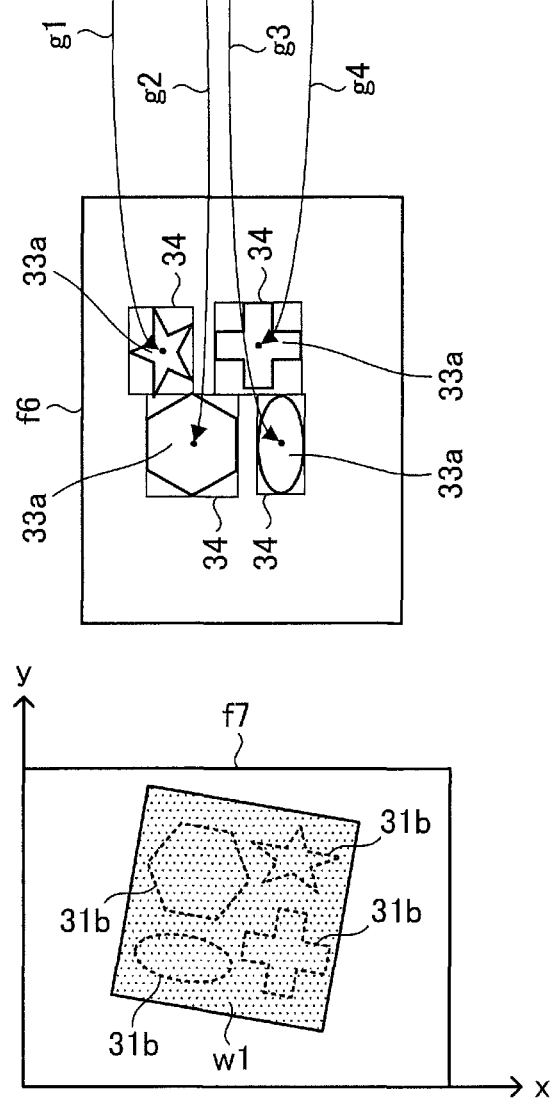
FIG. 16 is a diagram showing corrected processing plan loci superimposed on the workpiece in an image frame.

FIG. 16 is a diagram showing corrected processing plan loci 31b superimposed on the workpiece w1 in an image frame f7.

In step S13, the superimposition display unit 14 transforms the processing plan locus 31 in the machine coordinate system into the processing plan locus 31b in the image coordinate system by using the projection matrix obtained in the step S12 and makes the display device 15 display the new processing plan locus 31b so as to superimpose the new processing plan locus 31b on the workpiece w1 in the image frame f7. Accordingly, the processing plan locus 31 used before making the superimposing position correction is corrected and the new processing plan locus 31b is superimposed at the position where the new processing plan locus 31b should be superimposed on the workpiece w1. Further, the superimposition display unit 14 is capable of making the display device 15 display the image frame f7.

The laser processing machine 2 (specifically, the processing control unit 2b) is capable of performing the processing according to the new processing plan locus 31b. Further, the user can check the new processing plan locus 31b displayed on the display device 15. Thus, the user can monitor and control the operation of the laser processing machine 2 while viewing the new processing plan locus 31b displayed on the display device 15.

As described above, according to this embodiment, the position of the processing plan locus to be superimposed on the workpiece w1 is corrected by using the processing plan locus 31 and the processing track 33, and thus the superimposing position correction can be made with a simple method without the need of making a correction by using a checker pattern or the like every time the processing is performed.

Further, according to this embodiment, the superimposing position correction is made not by using a local feature value such as a circle but by using a shape feature value such as the processing track 33 and the processed region 33b, and thus it is possible to increase the accuracy of the shift judgment (step S7) between the processing plan locus (specifically, the processing plan locus 31a used in the step S7) and the processing track 33 and to increase the accuracy of the superimposing position correction even when the processing track 33 and the processed region 33b are hard to detect.

Figure 17:
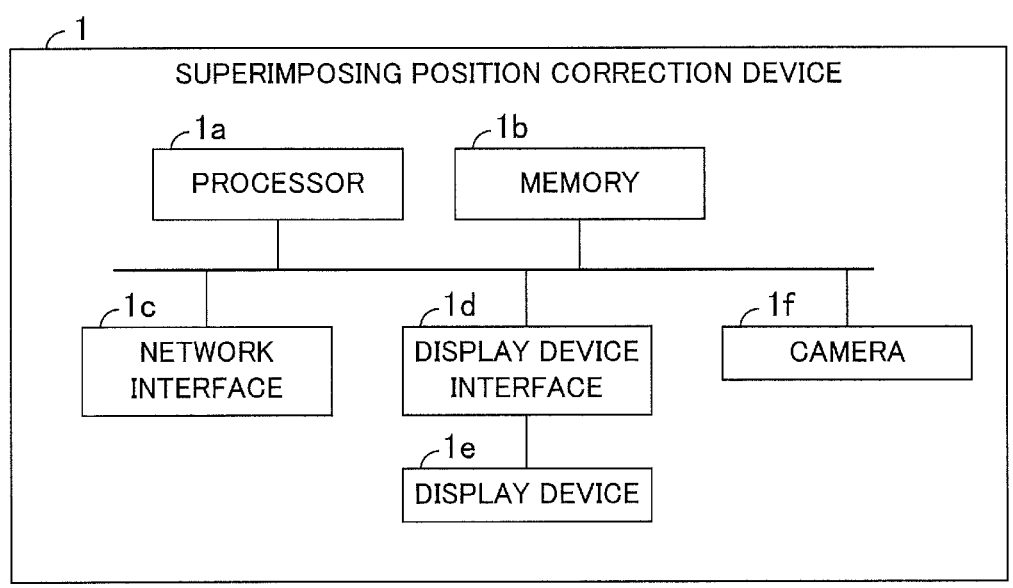
FIG. 17 is a block diagram showing a concrete example of a hardware configuration of the superimposing position correction device.

FIG. 17 is a block diagram showing a concrete example of a hardware configuration of the superimposing position correction device 1.

The functions of the image acquisition unit 12, the projective transformation unit 13, the superimposition display unit 14, the difference image generation unit 16, the processing plan image generation unit 17, the shift judgment unit 18, the subregion generation unit 19, the similar shape search unit 20, the representative point extraction unit 21 and the projection matrix calculation unit 22 described in the above embodiment can be implemented by a processor 1a such as a CPU (Central Processing Unit). Various data described in the above embodiment such as the subregions 34, the identified regions 35 and the barycenter coordinates can be stored in a memory 1b. The storage device 3 shown in FIG. 1 can be the memory 1b in the superimposing position correction device 1. In this case, data such as the processing plan locus 31 and the projection matrix 32 are stored in the memory 1b. A network interface 1c is communicatively connected with the laser processing machine 2 and the storage device 3. A camera 1f corresponds to the camera 1l shown in FIG. 1, and a display device 1e corresponds to the display device 15 shown in FIG. 1. The camera 1f is connected to the display device 1e via a display device interface 1d and the camera image is displayed on the display device 1e.

DESCRIPTION OF REFERENCE CHARACTERS

1: superimposing position correction device, 1a: processor, 1b: memory, 1c: network interface, 1d: display device interface, 1e: display device, 1f: camera, 2: laser processing machine, 2a: processing head, 2b: processing control unit, 3: storage device, 11: camera, 12: image acquisition unit, 13: projective transformation unit, 14: superimposition display unit, 15: display device, 16: difference image generation unit, 17: processing plan image generation unit, 18: shift judgment unit, 19: subregion generation unit, 20: similar shape search unit, 21: representative point extraction unit, 22: projection matrix calculation unit, 31, 31a, 31b: processing plan locus, 32: projection matrix, 33: processing track, 33a: processing plan region, 33b: processed region, f1: image frame (first image frame), f2: image frame (second image frame), f3, f4: difference image, w1, w2: workpiece.

What is claimed is:

1. A superimposing position correction device comprising:
    a processor to execute a program; and
    a memory to store the program which, when executed by the processor, performs processes of,
    acquiring a first image frame including a pre-processing image of a workpiece;
    acquiring a second image frame including a post-processing image of the workpiece;
    generating a difference image using the first image frame and the second image frame, the difference image being an image including a processed region that is difference between the first image frame and the second image frame;
    generating a processing plan image based on a predetermined processing plan locus;
    generating at least one subregion including a processing plan region of the workpiece, the processing plan region being determined based on the predetermined processing plan locus;
    searching the difference image for a region similar to the subregion and to acquire the region similar to the subregion as an identified region;
    extracting barycenter coordinates of the processing plan region included in the subregion in a machine coordinate system and barycenter coordinates of the processed region included in the identified region in an image coordinate system;
    calculating a projection matrix for performing projective transformation between the machine coordinate system and the image coordinate system by using the barycenter coordinates in the machine coordinate system and the barycenter coordinates in the image coordinate system; and
    transforming the predetermined processing plan locus in the machine coordinate system into a new processing plan locus in the image coordinate system by using the projection matrix.

2. The superimposing position correction device according to claim 1, further comprising judging whether the processing plan image is shifted from the difference image or not by comparing the processing plan image and the difference image.

3. The superimposing position correction device according to claim 2, wherein the judging is performed by judging whether the processing plan image is shifted from the difference image or not by comparing a pixel value of each pixel in the processing plan image and a pixel value of each pixel in the difference image in regard to coordinates equal to each other.

4. The superimposing position correction device according to claim 3, wherein the judging includes generating the at least one subregion when the processing plan image is shifted from the difference image.

5. The superimposing position correction device according to claim 4, wherein the at least one subregion includes four subregions.

6. The superimposing position correction device according to claim 1, wherein the searching is performed by calculating an Hu moment invariant of an image in the subregion and acquiring a region in the difference image as the identified region, the region having same size as the subregion and having an Hu moment invariant closest to the calculated Hu moment invariant.

7. The superimposing position correction device according to claim 1, wherein the extracting is performed by extracting the barycenter coordinates in the machine coordinate system by calculating an average of machine coordinates that are all coordinates in the processing plan region in the machine coordinate system and extracting the barycenter coordinates in the image coordinate system by calculating an average of image coordinates that are all coordinates in the processed region in the image coordinate system.

8. The superimposing position correction device according to claim 1, further comprising displaying the new processing plan locus on a display device so as to superimpose the new processing plan locus on the workpiece in the first image frame.

9. The superimposing position correction device according to claim 1, further comprising a camera to capture the workpiece.

10. A superimposing position correction method comprising:

acquiring a first image frame including a pre-processing image of a workpiece;

acquiring a second image frame including a post-processing image of the workpiece;

generating a difference image using the first frame image and the second frame image, the difference image being an image including a processed region that is difference between the first image frame and the second image frame;

generating a processing plan image based on a predetermined processing plan locus;

generating at least one subregion including a processing plan region of the workpiece determined based on the predetermined processing plan locus;

searching the difference image for a region similar to the subregion and acquiring the region similar to the subregion as an identified region;

extracting barycenter coordinates of the processing plan region included in the subregion in a machine coordinate system;

extracting barycenter coordinates of the processed region included in the identified region in an image coordinate system;

calculating a projection matrix for performing projective transformation between the machine coordinate system and the image coordinate system by using the barycenter coordinates in the machine coordinate system and the barycenter coordinates in the image coordinate system; and transforming the predetermined processing plan locus in the machine coordinate system into a new processing plan locus in the image coordinate system by using the projection matrix.

* * * * *